United States Patent
Fan et al.

(10) Patent No.: US 10,609,749 B2
(45) Date of Patent: Mar. 31, 2020

(54) NETWORK NODE AND METHOD THEREIN FOR CONFIGURING PDCP FOR A WIRELESS DEVICE

(71) Applicant: Telefonaktiebolaget LM Ericsson (publ), Stockholm (SE)

(72) Inventors: Rui Fan, Beijing (CN); Gunnar Mildh, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 84 days.

(21) Appl. No.: 15/521,068

(22) PCT Filed: Feb. 8, 2017

(86) PCT No.: PCT/SE2017/050116
§ 371 (c)(1),
(2) Date: Apr. 21, 2017

(87) PCT Pub. No.: WO2018/124955
PCT Pub. Date: Jul. 5, 2018

(65) Prior Publication Data
US 2018/0332649 A1 Nov. 15, 2018

(30) Foreign Application Priority Data
Dec. 29, 2016 (WO) ............... PCT/CN2016/113053

(51) Int. Cl.
*H04W 76/16* (2018.01)
*H04W 48/18* (2009.01)
(Continued)

(52) U.S. Cl.
CPC ........... *H04W 76/16* (2018.02); *H04W 48/18* (2013.01); *H04W 48/20* (2013.01); *H04W 76/12* (2018.02);
(Continued)

(58) Field of Classification Search
CPC ..... H04W 48/18; H04W 48/20; H04W 76/12; H04W 76/16; H04W 76/22; H04W 92/20; H04W 92/24
See application file for complete search history.

(56) References Cited

U.S. PATENT DOCUMENTS

2016/0119184 A1* 4/2016 Soriaga ................ H04W 8/005
370/254
2016/0127882 A1* 5/2016 Agiwal ................ H04L 9/0861
713/150
(Continued)

FOREIGN PATENT DOCUMENTS

| EP | 3065484 A1 | 9/2016 |
|---|---|---|
| WO | 2016060897 A1 | 4/2016 |
| WO | 2016118103 A1 | 7/2016 |

*Primary Examiner* — Benjamin H Elliott, IV
(74) *Attorney, Agent, or Firm* — Murphy, Bilak & Homiller, PLLC

(57) ABSTRACT

A wireless device is configured for wirelessly communicating with one or more types of Radio Access Networks (RANs) providing control-plane connectivity to one or both of a first type of core network and a second type of core network. The device configures a Packet Data Convergence Protocol (PDCP) at the device, e.g., at least for initial control-plane signaling, in dependence on whether the device is connected, or connecting, to the first type or the second type of core network. In at least one embodiment, the device configures PDCP for the second type of core network as a default choice, when control-plane connectivity to the second core network is available. In an example arrangement, the RAN types are LTE and 5G New Radio (NR), and the core network types are Evolved Packet Core (EPC) and 5G New Generation Core Network (NGCN).

14 Claims, 12 Drawing Sheets

(51) Int. Cl.
  *H04W 92/24*   (2009.01)
  *H04W 76/12*   (2018.01)
  *H04W 48/20*   (2009.01)
  H04W 92/20   (2009.01)
  H04W 76/22   (2018.01)
  H04W 48/16   (2009.01)

(52) U.S. Cl.
  CPC ............ *H04W 92/24* (2013.01); *H04W 48/16* (2013.01); *H04W 76/22* (2018.02); *H04W 92/20* (2013.01)

(56) References Cited

U.S. PATENT DOCUMENTS

| | | | |
|---|---|---|---|
| 2016/0135220 A1* | 5/2016 | Jha | H04W 74/002 |
| | | | 455/434 |
| 2016/0269945 A1* | 9/2016 | Jang | H04W 72/0453 |
| 2016/0286600 A1* | 9/2016 | Faccin | H04W 12/06 |
| 2016/0337254 A1 | 11/2016 | Karaki et al. | |
| 2017/0215122 A1* | 7/2017 | Nigam | H04W 12/08 |
| 2017/0245316 A1* | 8/2017 | Salkintzis | H04W 76/27 |
| 2017/0332372 A1* | 11/2017 | Lee | H04W 72/0413 |
| 2018/0020418 A1* | 1/2018 | Chandramouli | H04W 60/005 |
| 2018/0041936 A1* | 2/2018 | Kim | H04W 4/70 |
| 2018/0139030 A1* | 5/2018 | Kim | H04L 5/0042 |
| 2018/0183717 A1* | 6/2018 | Panchal | H04L 47/2475 |
| 2018/0227793 A1* | 8/2018 | Kim | H04W 4/70 |
| 2018/0288657 A1* | 10/2018 | Stojanovski | H04W 36/0055 |
| 2018/0332649 A1* | 11/2018 | Fan | H04W 76/16 |
| 2018/0376384 A1* | 12/2018 | Youn | H04W 36/00 |

* cited by examiner

Fig. 1, Option 3)

Fig. 2 Option 3a)

Fig. 3, Option 4)

Fig. 4, Option 4a)

Fig. 5, Option 7)

Fig. 6, Option 7a)

Fig. 8  Method in Network node 111, 112

Fig. 9  Method in Wireless device 120

NETWORK NODE AND METHOD THEREIN FOR CONFIGURING PDCP FOR A WIRELESS DEVICE

TECHNICAL FIELD

Embodiments herein relate to a network node and a method therein. In particular, they relate to configuring a Packet Data Convergence Protocol (PDCP) for a wireless device.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation ( 5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

5G is currently being standardized in 3GPP while at the same time LTE will continue evolving which means in a long run, LTE and 5G will coexist together. Tight interworking between LTE and 5G will provide better performance for end user and also save the cost for network operator. Then there will be several scenarios also referred to as architecture or connectivity options according to the standard to consider how 5G and LTE inter-work.

Currently there is also ongoing standardization of Next Generation Core Network, called NGCN or 5G-CN or similar. The NGCN will support connectivity of both 5G radio or NR, and LTE.

Some Definitions:

The wording non-standalone as used herein means using LTE as the control plane anchor for supporting NR 5G as an extra data boost carrier, which arrangement is also referred to as Dual Connectivity (DC), as compared to standalone NR 5G, which implies full control plane capability for NR 5G.

The wording master node when used herein means the node which is the control plane anchor. The control plane anchor handles initial connectivity and mobility for the UE such as a wireless device. The master node is also responsible for activating the secondary node, also referred to as setup DC. The wording secondary node when used herein means the node that provides user plane connectivity in addition to the user plane connectivity provided by the master node. The wireless device in DC is simultaneously connected to both the master and secondary node.

The radio protocol architecture for LTE is separated into a control plane architecture and a user plane architecture. In the user plane between the e-Node B and UE, the application creates data packets that are processed by protocols such as Transmission Control Protocol (TCP), User Datagram Protocol (UDP) and Internet protocol (IP). In the control plane, the Radio Resource Control (RRC) protocol creates signalling messages that are exchanged between the eNB and the UE. In both cases, the information is processed by the PDCP, the Radio Link Control (RLC) protocol and the Medium Access Control (MAC) protocol, before being passed to the physical layer for transmission.

The relevant options to the discussion in this document comprise the following Non-Standalone scenarios as specified in the standardized in 3GPP. The solid lines in the scenarios below represent use plane traffic and the dashed lines in the scenarios below represent control plane signaling connections.

Option 3) is depicted in FIG. 1. In this scenario, a wireless device is using NR as a secondary node and LTE as master node connected to EPC. In this scenario there is no direct user plane between EPC eNB and NR gNB instead NR traffic is routed via the LTE eNB.

Option 3a) is depicted in FIG. 2. In this scenario, the wireless device is using NR as a secondary node and LTE as master node connected to EPC. In this scenario there is a user plane A1 between EPC and the NR gNB. 1A in FIG. 2 means user plane connection.

Option 4) is depicted in FIG. 3. In this scenario, the wireless device is using 5G NR as a master node connected to NGCN. LTE eNB is a secondary node. In this scenario there is no direct user plane between NGCN and LTE eNB. LTE user plane is routed via 5G NR node.

Option 4a) is depicted in FIG. 4. Here the wireless device is using 5G NR as a master node connected to NGCN. The LTE eNB is a secondary node. In this scenario, a user plane between the NGCN and the LTE eNB is referred to as 1A like in FIG. 4, which means that the LTE eNB data is sent directly to the NGCN.

Option 7) is depicted in FIG. 5. Here, the wireless device is using NR as a secondary node and LTE as master node connected to the EPC. In this scenario, there is no direct user plane between the EPC eNB and the NR gNB; instead, NR traffic is routed via the LTE eNB.

Option 7a) is depicted in FIG. 6. In this scenario, the wireless device is using NR as a secondary node and LTE as a master node connected to the EPC. In this scenario, there is a user plane 1A between the EPC and the NR gNB. The annotation 1A like in FIG. 6 means user plane connection.

From a protocol perspective, the PDCP protocol for NR gNB would be different from that for LTE eNB, similarly, the Non-access stratum (NAS) protocol for 5G NGCN would be different from that for EPC, although they may be similar.

NAS is a functional layer in the UMTS and LTE wireless telecom protocol stacks between the core network and UE. This layer is used to manage the establishment of communication sessions and for maintaining continuous communications with the user equipment as it moves. The NAS is defined in contrast to the Access Stratum which is responsible for carrying information over the wireless portion of the network. A further description of NAS is that it is a protocol for messages passed between the UEs and core network nodes that are passed transparently through the radio network. Once the UE establishes a radio connection, the UE uses the radio connection to communicate with the core network nodes to coordinate service. The distinction is that the Access Stratum is for dialogue explicitly between the UE and the RAN and the NAS is for dialogue between the UE and core network nodes. For LTE, the Technical Standard for NAS is 3GPP TS 24.301.

That is, for a UE it can either connect to EPC or connect to 5G NGCN. Its master node may be either LTE eNB or NR gNB, and its secondary node may be either LTE eNB or NR gNB.

The problem is that as the UE may either connect to EPC or NGCN, its master node may be either eNB or gNB.

SUMMARY

It is therefore an object of embodiments herein to further improve the performance of a communications network comprising multiple generations of communications networks.

According to a first aspect of embodiments herein, the object is achieved by a method performed by a network node for configuring a Packet Data Convergence Protocol, PDCP, for a wireless device in a communications network. The communications network comprises a first type of core network and a second type of core network. The network node decides whether the network node is a master node or a secondary node for the wireless device.

When the network node is a master node, it configures the PDCP for the wireless device based on which type of core network the wireless device connects to, out of a core network of a first type, and a core network of a second type.

When the network node is a secondary node, it configures the PDCP for the wireless device based on any one or more out of:

Which type of master node the network node connects to, out of a master node of a first type, and a master node of a second type, and which type of core network the wireless device connects to, out of a core network of a first type, and a core network of a second type.

The first type and the second type relate different generations of telecommunication networks.

According to a second aspect of embodiments herein, the object is achieved by method performed by a wireless device, for configuring a Packet Data Convergence Protocol, PDCP, for the wireless device in a communications network. The communications network comprises a first type of core network and a second type of core network. The wireless device obtains information about which type of core network the wireless device connects to out of a first type and a second type relating to different generations of telecommunication networks. The wireless device configures the PDCP for the wireless device based on which type of core network the wireless device connects to, out of a core network of a first type, and a core network of a second type.

According to a third aspect of embodiments herein, the object is achieved by a network node for configuring a Packet Data Convergence Protocol, PDCP, for a wireless device in a communications network. The communications network is adapted to comprise a first type of core network and a second type of core network. The network node being adapted to:

Decide whether the network node is a master node or a secondary node for the wireless device.

When the network node is a master node, configure the PDCP for the wireless device based on which type of core network the wireless device connects to, out of a core network of a first type, and a core network of a second type.

When the network node is a secondary node, configure the PDCP for the wireless device based on any one or more out of:—Which type of master node the network node connects to, out of a master node of a first type, and a master node of a second type, and—which type of core network the wireless device connects to, out of a core network of a first type, and a core network of a second type.

The first type and the second type are adapted to relate to different generations of telecommunication networks.

According to a fourth aspect of embodiments herein, the object is achieved by a wireless device for configuring a Packet Data Convergence Protocol, PDCP, for the wireless device in a communications network. The communications network is adapted to comprise a first type of core network and a second type of core network. The wireless device is adapted to:

Obtain information about which type of core network the wireless device connects to out of a first type and a second type adapted to relate to different generations of telecommunication networks, and configure the PDCP for the wireless device based on which type of core network the wireless device connects to, out of a core network of a first type, and a core network of a second type.

Since the network node configures the PDCP for the wireless device based on whether it is a master node or a secondary node, which type of core network the wireless device connects to and which type of master node the network node connects to, the PDCP can be used by the wireless device in different scenarios. In this way the PDCP is configured according to the actual needs. This results in less signaling and data overhead since the PDCP header such as the Protocol Data Unit (PDU) header only need to include the information fields needed for a particular configuration, which in turn further improves the performance of a communications network comprising multiple generations of communications networks.

An advantage with embodiments herein is that the same PDCP protocol specification may be used to support communication with wireless devices attached to different core networks or master node, and the PDCP protocol can be optimally configured depending on the different functionalities and features available when connected to different core networks or master nodes associated with different generations of communications networks.

BRIEF DESCRIPTION OF THE DRAWINGS

Examples of embodiments herein are described in more detail with reference to attached drawings in which.

DETAILED DESCRIPTION

Figure 1:
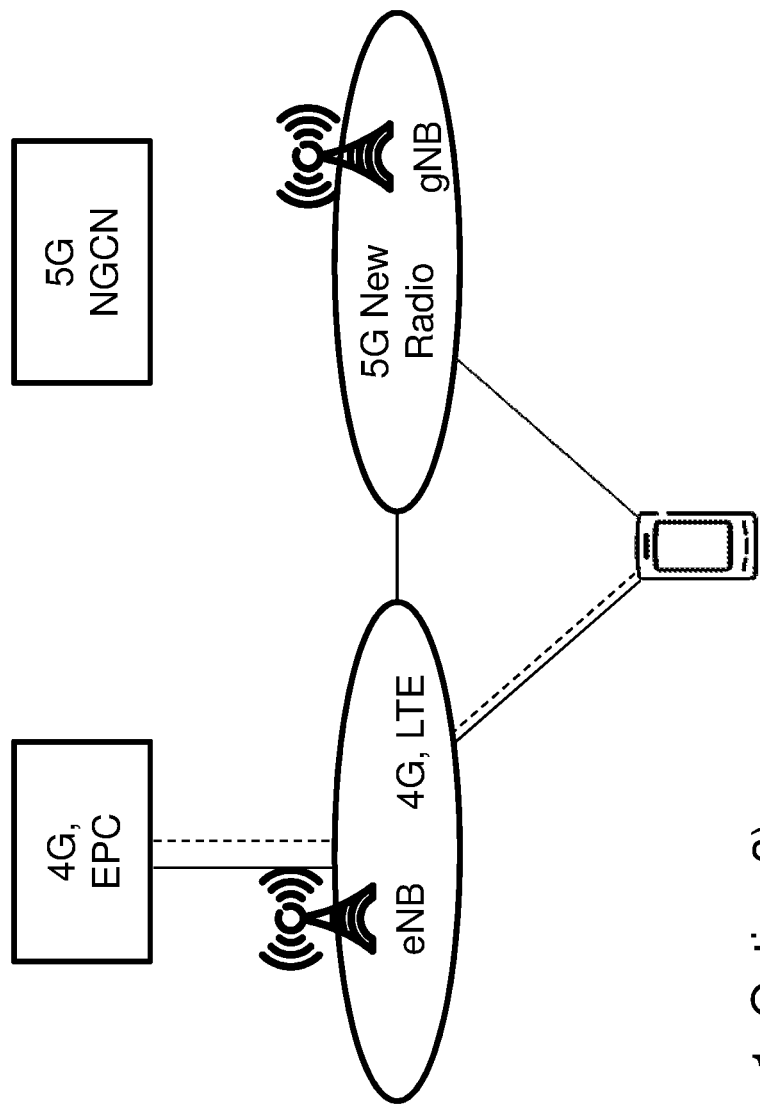
FIG. 1 is a schematic block diagram illustrating prior art.
Figure 2:
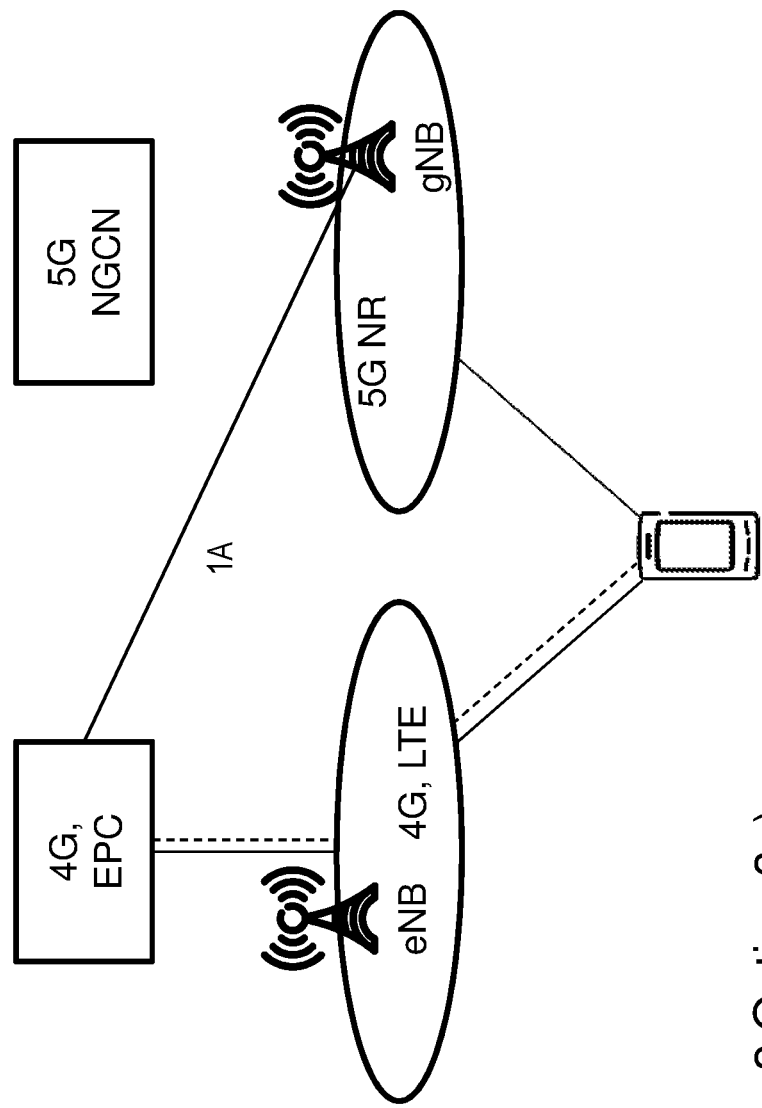
FIG. 2 is a schematic block diagram illustrating prior art.
Figure 3:
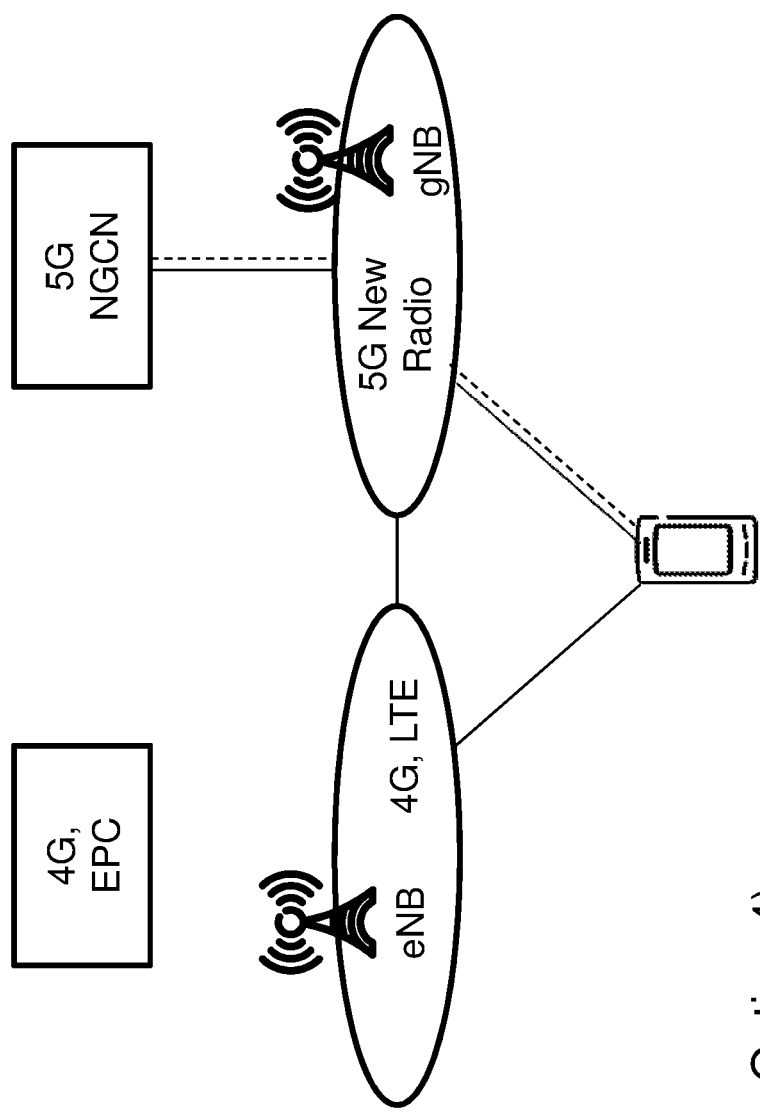
FIG. 3 is a schematic block diagram illustrating prior art.
Figure 4:
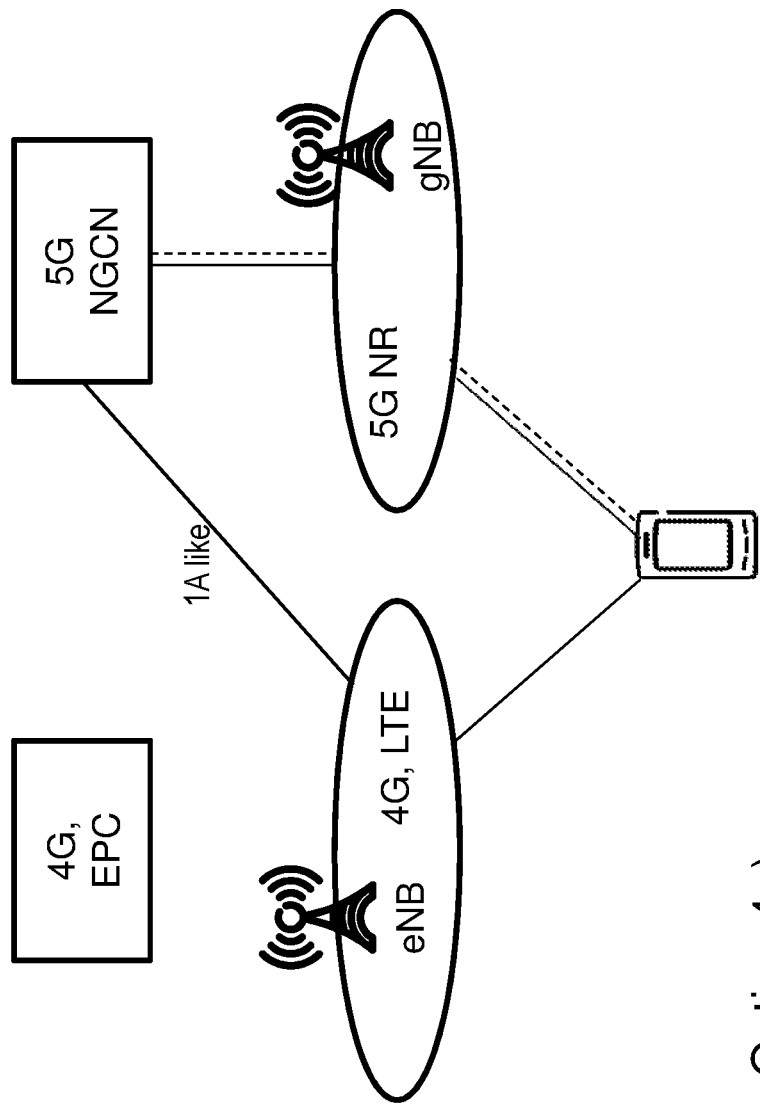
FIG. 4 is a schematic block diagram illustrating prior art.
Figure 5:
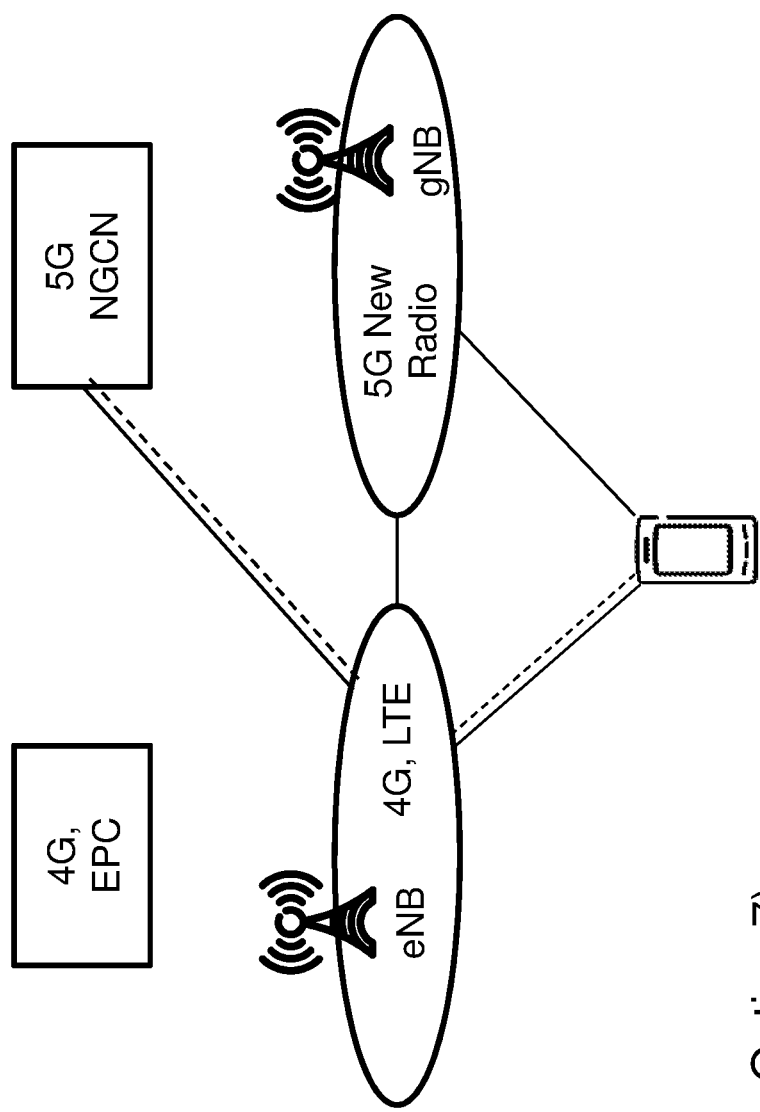
FIG. 5 is a schematic block diagram illustrating prior art.
Figure 6:
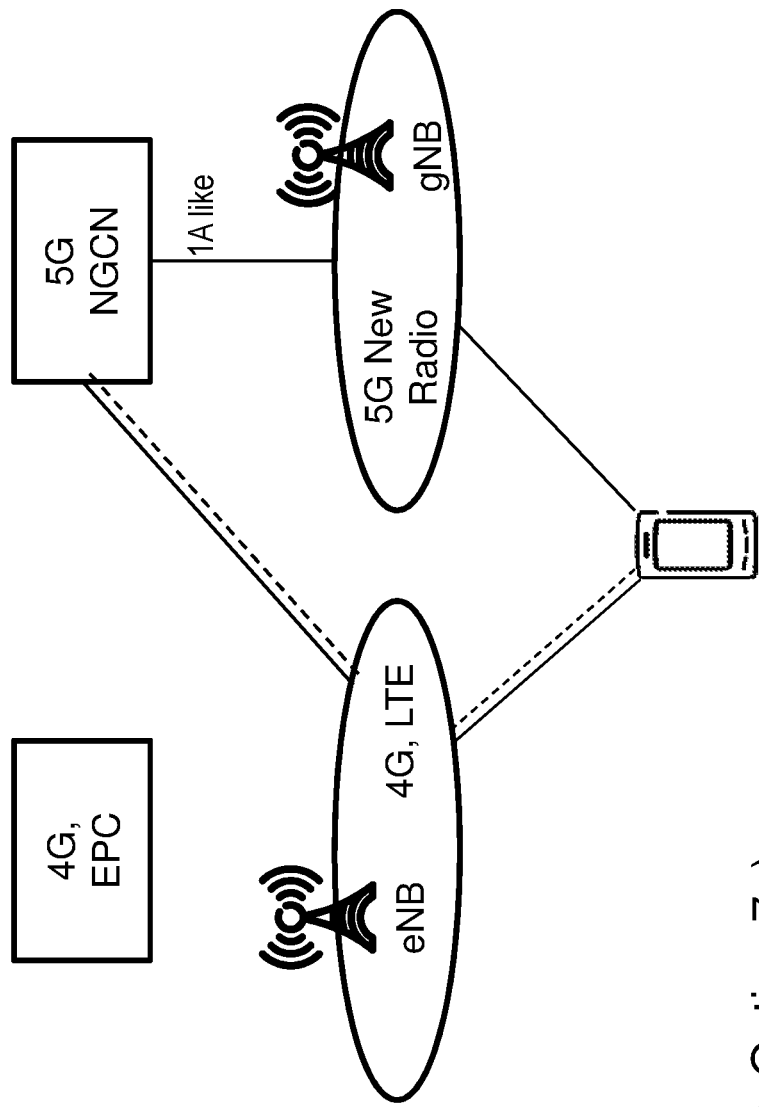
FIG. 6 is a schematic block diagram illustrating prior art.

As part of developing embodiments herein the inventors recognized a problem which first will be discussed.

The problem is that as a wireless device such as a UE may either connect to EPC or NGCN, its master node may be either eNB or gNB. Which protocol to configure and/or use need be decided. For example, for a NR gNB, or eLTE eNB, if the UE connect with EPC, then it is not necessary for them to configure UE PDCP protocol to support QoS flow ID as this is determined or used by NGCN. Another example, for a UE camping in eLTE eNB, if this eLTE eNB connect to NGCN, then it is inappropriate for UE to send EPC version NAS message to NGCN. The wording QoS flow ID when used herein means an information element transferred in the packet header over the CN and RAN interface and the radio interface. Over the CN and RAN interface the information element may be sent in a General Packet Radio Services (GPRS) Tunneling Protocol (GTP) header and over the radio interface it may be sent in the PDCP header. The QoS flow ID is used by the wireless device and the NGCN to indicate which QoS flow a given packet is related to. This is in turn used to map the packet on the correct Data Radio Bearer over the radio to ensure correct QoS treatment. The mapping is performed both in the DL in a network node such as an eNB and in the UL in the wireless device. The mapping between QoS flow and Data Radio Bearers (DRB) may either be explicitly signaled from the RAN node to the wireless device or implicitly indicated by RAN node based on the DL mapping used.

To summarize, both RAN node and UE need to know which version of protocol to use in different scenarios.

Embodiments herein provide methods, where each network node such as RAN node may configure PDCP protocol for a wireless device dynamically according to the core network the wireless device connect to, or according to the master node the network node connect to. For the network node being a master node which has signaling with core network, if the core network node is EPC, then QoS flow ID is not necessary to be configured. If core network node is NGCN, then QoS flow ID is needed. QoS flow ID should here be seen as an example parameter that may be different depending if the UE is connected to EPC or NGCN. Other parameters may also be handled in the same way e.g. Header Compression related parameters, Encryption related parameters such as PDCP sequence number used as input to encryption algorithm, Integrity protection of user data related parameters, or parameters related to in-sequence delivery, or the size of the PDCP sequence number, which may be different or only be applied if UE is connected to NGCN or if the master node is an NR gNB. For the network node being a secondary node which does not have signaling with core network, it checks the master node it connect to. If master node is LTE, then QoS flow ID is not necessary, otherwise, QoS flow ID is needed. This is an advantage since QoS flow ID and other parameters only need to be included in PDCP header when needed, including them when they are not needed would add unnecessary signaling overhead.

Embodiments herein provide methods, wherein the network node is an eLTE eNB and broadcasts in its system Information, such as Master Information Block (MIB) or System Information Block (SIB) 1, 2, . . . , that it support to connect to NGCN. The system information is today specified in 3GPP 36.331 RRC protocol specification. For those wireless devices that also support to connect to NGCN, they may send an indication to the eLTE eNB which CN node they want to communicate with. The indication may be carried in RRC protocol or other protocol. In addition to the indication they may send a NAS message formatted according to the NAS protocol used in the respective core network. For example if the wireless device wants to communicated with the NGCN it will generate a NGCN NAS message and send this to eLTE eNB so that eLTE eNB can then forward UE NAS message to NGCN. This is an advantage since it enables the same eLTE eNB to serve both legacy wireless devices connected to EPC and new wireless devices connectivity to NGCN. These wireless devices may be multiplexed on the same radio channel or carrier which avoids the need to deploy new carriers just to serve NGCN users. Deploying new dedicated carriers for NGCN is very expensive for the operator since it needs to obtain licensed for new frequency bands and need to deploy new radio hardware on a lot of radio sites.

In some embodiments, whether PDCP protocol need to include QoS flow ID or not depends on whether network node such as the RAN node is a master node or secondary node, and whether network node such as the RAN node connect to EPC or NGCN, or the RAN node connect to NR gNB or LTE eNB.

Some embodiments herein relate to tight interworking between LTE and 5G which will provide better performance for end user and also save the cost for network operator.

Figure 7:
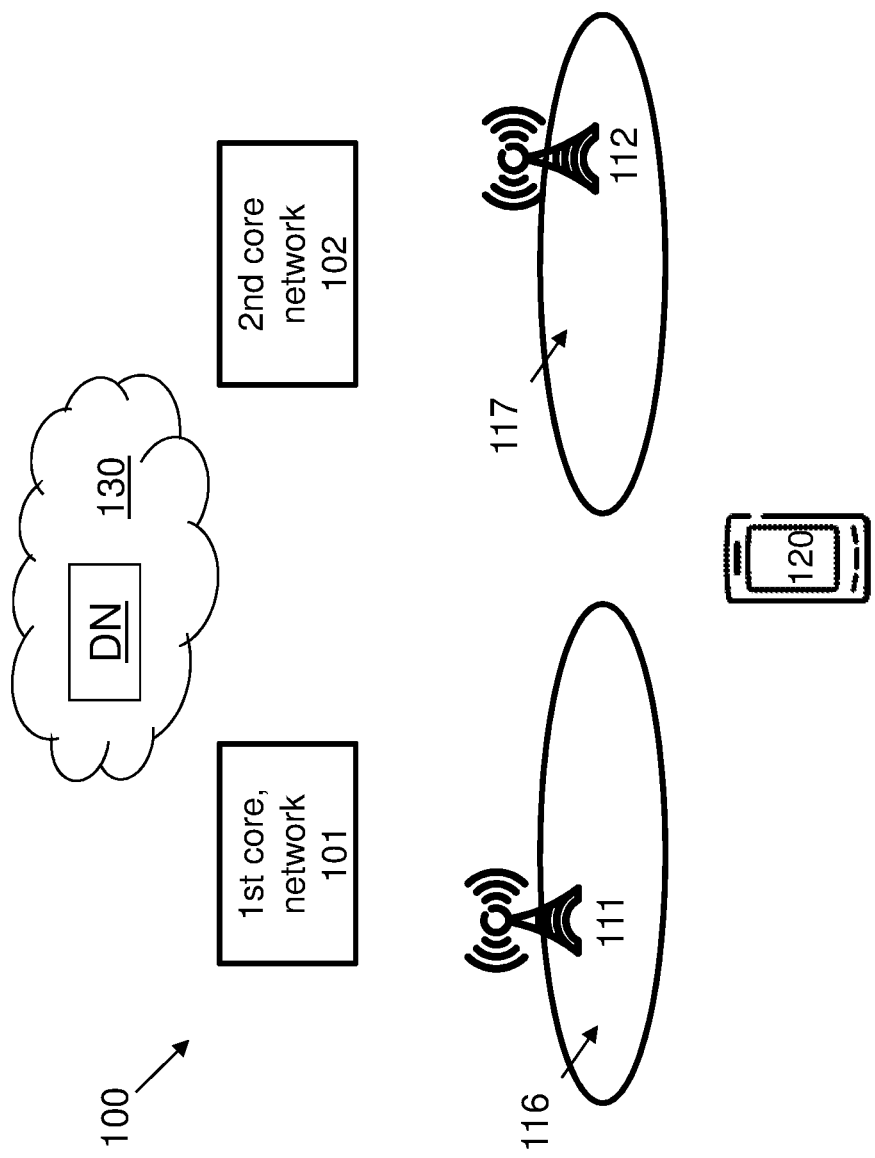
FIG. 7 is a schematic block diagram illustrating embodiments of a communications network.

FIG. 7 depicts an example of a wireless communications network 100 in which embodiments herein may be implemented. The wireless communications network 100 implementing embodiments herein may comprise one or more RANs and one or more CNs. The wireless communication network 100 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, such as tight interworking between LTE and 5G. However, embodiments are also applicable in further development of other existing wireless communication systems such as e.g. WLAN, WCDMA and LTE. The wireless communications network 100 may comprise wireless communications networks of a first type and a second type. The first type and the second type relates different generations of telecommunication networks, such a 4G wireless communications network and a 5G wireless communications network.

The wireless communications network 100 comprises a core network 101 of the first type such as e.g. EPC and a core network 102 of the second type such as e.g. NGCN.

Network nodes 111, 112 operate in the wireless communication network 100. The network nodes 111, 112 providing radio coverage over a geographical area. The network nodes 111, 112 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a 5G base station such as a gNB, a base transceiver station, a radio remote unit, an Access Point Base Station, a base station router, a transmission arrangement of a radio base station, a stand-alone access point or any other network unit capable of communicating with a wireless device within the service area served by the network nodes 111, 112 depending e.g. on the first radio access technology and terminology used. The network nodes 111, 112 may be referred to as a serving radio network node and communicates with a wireless device 120 with Downlink (DL) transmissions and Uplink (UL) transmissions from the wireless device 120. The network node according to embodiments herein may be any of a network node 111 of a first type such as e.g. an eNB of LTE, or a network node of a second type such as a gNB of 5G. Therefore the network node according to embodiments herein is referred to as the network node 111, 112. Thus the first type and the second type relate different generations of telecommunication networks. When the network node 111, 112 according to embodiments herein is a network node 111 of the first type such as e.g. an eNB of LTE, it may operate in a RAN 116 of a first type e.g. using LTE. When the network node 111, 112 according to embodiments herein is a network node 112 of the second type such as e.g. a gNB of 5G, it may operate in a RAN 117 of a second type e.g. using 5G NR.

In the wireless communication network 100, radio nodes such as e.g. the wireless device 120 operate. The wireless device 120 may be a UE, mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell. The wireless device 120 may support the first type and the second type of different generations of telecommunication networks such a 4G wireless communications network and a 5G wireless communications network.

A method for configuring a Packet Data Convergence Protocol, PDCP, for a wireless device 120 in a communications network 100, is performed by the network node 111, 112. As an alternative, a Distributed Node (DN) and functionality, e.g. comprised in a cloud 130 as shown in FIG. 7, may be used for performing or partly performing the method.

Figure 8:
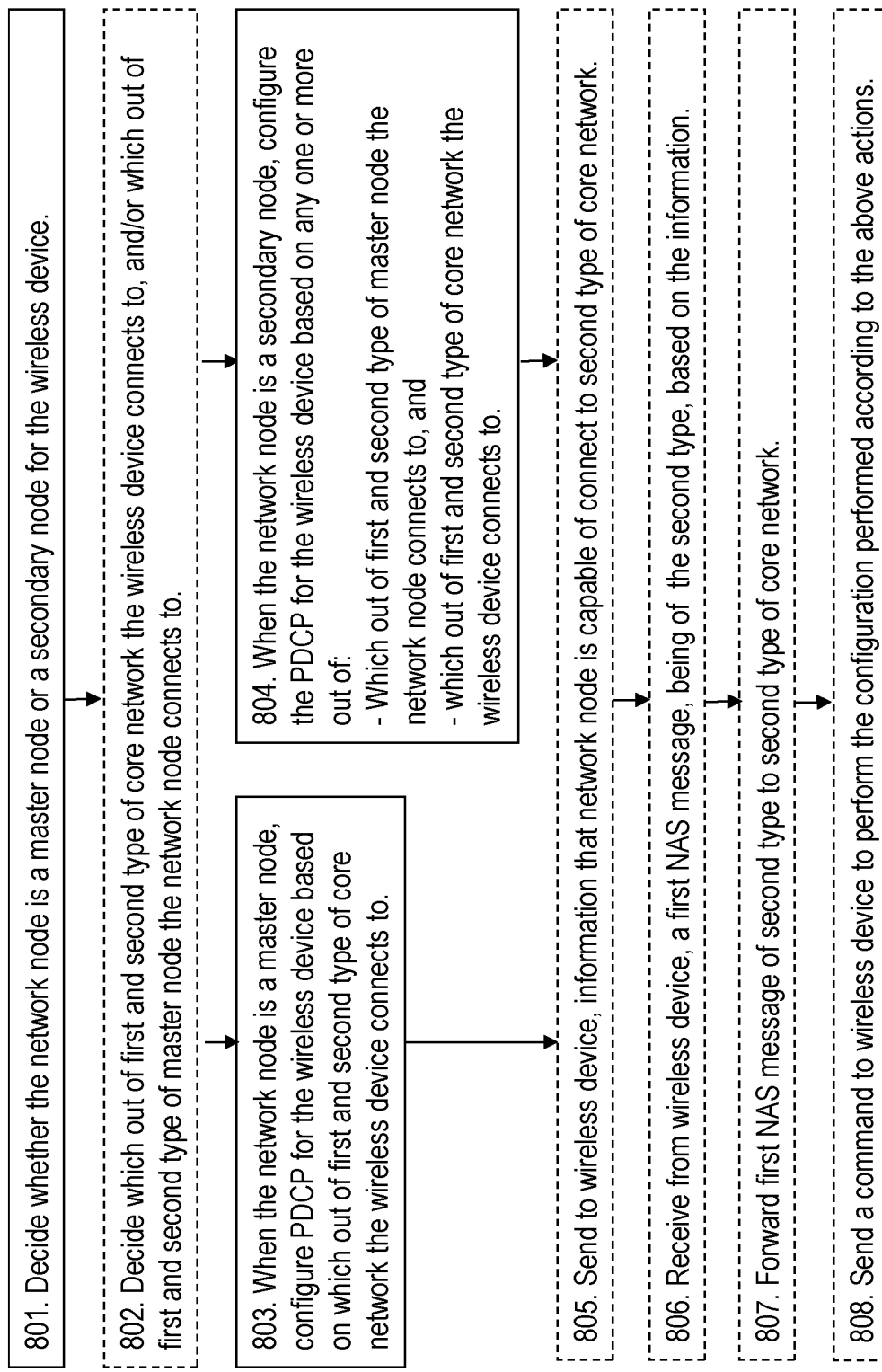
FIG. 8 is a flowchart depicting embodiments of a method in a network node.

Example embodiments of a method performed by the network node 111, 112 for configuring a PDCP for the wireless device 120 in the communications network 100, will be described with reference to a flowchart depicted in FIG. 8. As mentioned above the first type and the second type relate different generations of telecommunication networks. The first type of telecommunication network may relate to 4G, and the second type of telecommunication network may relate to 5G. The communications network 100 comprises a first type of core network 101 and a second type of core network 102.

The method comprises the following actions, which actions may be taken in any suitable order as will be discussed below. Actions that are optional are presented in dashed boxes in FIG. 8.

Action 801

According to an example scenario, the wireless device 120 is about to communicate in the wireless communications network 100. It is served by the network node 111, 112, i.e. either by the network node 111 or the network node 112. To know how to configure the PDCP for the wireless device 120 in a dynamic way, the network node 111, 112 decides whether the network node 111, 112 is a master node or a secondary node for the wireless device 120. This will be a base for deciding how to configure the PDCP for the wireless device 120 below.

According to an example scenario of embodiments herein, for a RAN node such as the network node 111, 112, the decision of whether a configuration of the PDCP protocol need to include parameters or not depends on the role of this network node 111, 112, whether it is a master node or a secondary node. The parameters may comprise any one or more out of: QoS flow ID, Header Compression related parameters, Encryption related parameters such as PDCP sequence number used as input to encryption algorithm, Integrity protection of user data related parameters, or parameters related to in-sequence delivery, or the size of the PDCP sequence number.

If the network node 111, 112 is a master node, the network node 111, 112 configures PDCP according to which core network the wireless device 120 connects to. This is described in Action 803 below. This is since certain features of PDCP are only supported or useful for one of the core networks. If the wireless device 120 connects to first type of core network 101 such as e.g. EPC, then the network node 111, 112 configures PDCP for the wireless device 120 not to include QoS flow ID. If the wireless device 120 connects to the second type of core network 102 such as e.g. 5G NGCN, then the network node 111, 112 configures the PDCP for the wireless device 120 to include QoS flow ID.

If the network node 111, 112 is a secondary node, the network node 111, 112 configures PDCP according to which master node the network node 111, 112 connects to. This is described in Action 804 below. This is since certain features supported by PDCP is only supported or useful if the master eNB is of a certain type. If the network node 111, 112 connects to a master node of NR gNB, then it configures PDCP for the wireless device 120 to include QoS flow ID. If it connects to a master node of LTE eNB, then it configures PDCP for the wireless device 120 to not include QoS flow ID.

If the network node 111, 112 is a secondary node, the network node 111, 112 may further configure PDCP according to which core network the wireless device 120 connects to. This is also described in Action 804 below. This is since certain features of PDCP are only supported or useful for one of the core networks. If the wireless device 120 connects to first type of core network 101 such as e.g. EPC, then the network node 111, 112 configures PDCP for the wireless device 120 not to include QoS flow ID. If the wireless device 120 connects to the second type of core network 102 such as e.g. 5G NGCN, then the network node 111, 112 configures the PDCP for the wireless device 120 to include QoS flow ID.

Action 802

In some embodiments, the network node 111, 112 decides which type of core network the wireless device 120 connects to, out of the first type of core network 101, and the second type of core network 102. The first type of core network may relate to an EPC core network, and the second type of core network relates a 5G core network such as NGCN.

There are different ways for the network node 111, 112 to decide which type of core network the wireless device 120 connects to.

One way is to decide it based on statically configured information obtained from Operations And Management (OAM). E.g. in OAM, it is designated which core network node ID that corresponds to EPC, and which core node ID corresponds to NGCN, or which IP address corresponds to EPC, which other IP address corresponds to NGCN. The network node 111, 112 may then know such information when it decides to contact the core network.

Another way is to decide it based on dynamic information obtained in signaling from the core network. The network node 111, 112 may decide based on knowing the type of core network via a signaling message from core network to the network node 111, 112. The signaling information may include certain protocol or information elements that indicated which core network type the network node is communicating with.

In some of these embodiments or in some other embodiments wherein the network node 111, 112 is a secondary node, the network node 111, 112 decides which type of master node the network node 111, 112 connects to, out of the first type of master node, and the second type of master node.

The way for the network node 111, 112 to decide which master node it connects to may be similar as deciding the type of core network above.

One way is to decide it based on statically configured information obtained from OAM. That is, in OAM, it is designated which network node ID such as RAN node ID that corresponds to an LTE eNB, and which network node ID that corresponds to the NR gNB, or which IP address corresponds to a node of NR gNB, which node ID or IP address corresponds to a node of LTE eNB.

Another way is to decide it based on dynamic information from signaling from the master node such as a RAN master node. The network node 111, 112 being a secondary node may know such information via signaling from master node to the network node 111, 112 being the secondary node. The signaling information may include certain protocol or information elements that indicated which core network type the network node is communicating with.

Action 803

This action is performed in embodiments where in embodiments where the network node 111, 112 is a master node.

When the network node 111, 112 is a master node, the network node 111, 112 configures the PDCP for the wireless device 120 based on which type of core network the wireless device 120 connects to, out of the core network 101 of a first type, and the core network 102 of a second type.

The configuring of the PDCP for the wireless device 120 may comprise configuring PDCP parameters that may be different depending on type of network, and the network node 111, 112 being a master node. These PDCP parameters may comprise any one or more out of: QoS flow ID, Header Compression related parameters, Encryption related parameters, Integrity protection of user data related parameters, and parameters related to in-sequence delivery, or the size of a PDCP sequence number.

In some of these embodiments, wherein the network node 111, 112 is a master node, the configuring the PDCP for the wireless device 120 based on which type of core network the wireless device 120 connects to may comprise:
  When the network node 111, 112, connects to the first type of core network, configuring the PDCP without Quality of Service, QoS, flow Identity, ID, for the wireless device 120, and
  when the network node 111, 112, connects to the second type of core network configuring the PDCP with QoS flow ID for the wireless device 120.

Action 804

This action is performed in embodiments where in embodiments where the network node 111, 112 is a secondary node.

In these embodiments, when the network node 111, 112 is a secondary node, the network node 111, 112 configures the PDCP for the wireless device 120 based on any one or more out of:
  (1) Which type of master node the network node 111, 112 connects to, out of a master node of a first type, and a master node of a second type, and
  (2) which type of core network the wireless device 120 connects to, out of a core network 101 of a first type, and a core network 102 of a second type.

In these embodiments, there are two options, (1) and (2). The first option (1) may be used when the PDCP configuration is dependent on the master node. This may for instance be related to what protocol release or radio access type the master node is. The second option (2) may be used when the PDCP configuration is dependent on the core network type that the wireless device 120 is connected to and may for instance be related to what QoS framework is used, or what security configuration is applied.

The configuring of the PDCP for the wireless device 120 may comprise configuring PDCP parameters that may be different depending on type of network, and the network node 111, 112 being a secondary node. These PDCP parameters may comprise any one or more out of: QoS flow ID, Header Compression related parameters, Encryption related parameters, Integrity protection of user data related parameters, and parameters related to in-sequence delivery, or the size of a PDCP sequence number.

In the embodiments, wherein the network node 111, 112 is a secondary node, the configuring of the PDCP for the wireless device 120 based on (1) which type of master node the network node 111, 112 connects may comprise: When the network node 111, 112, connects to the first type of master node, configuring the PDCP without QoS flow ID for the wireless device 120, and when the network node 111, 112, connects to the second type of master node, configuring the PDCP with QoS flow ID for the wireless device 120. The first type of master node may relate to an LTE network node, and the second type of master node may relate to a 5G core network.

In the embodiments, wherein the network node 111, 112 is a secondary node, and the configuring of the PDCP for the wireless device 120 based on (2) which type of core network the wireless device 120 connects to comprises: When the wireless device 120 connects to the first type of core network, configuring the PDCP without QoS flow ID for the wireless device 120, and when the network node 111, 112, connects to the second type of core network, configuring the PDCP with QoS flow ID for the wireless device 120.

Action 805

In the embodiments, wherein the network node 111, 112 is a first type of network node 111, is capable of connect to the second type of core network 102, and wherein the wireless device 120 is capable to connect to the second type of core network 102, the Actions 805-807 of configuration of NAS protocol below may be performed.

For the network node 111 being an eLTE eNB, it may connect to both EPC and NGCN, as it needs to support service for both 4G wireless device and a 5G wireless device. This is different from a legacy system where each RAN node can only connect to one type of core network.

Due to this reason, if there is nothing special such as e.g. an indication of which CN is supported from the network node 111 being an eLTE eNB, the wireless device 120 cannot decide which NAS version it need to use to connect to core network.

Therefore, the network node 111 being an eLTE eNB need to inform the wireless device 120 which core network the network node 111 connect to in its broadcast system information. Or at least if the network node 111 being an eLTE eNB connects to NGCN, it needs to inform the wireless device 120 that it can connect to the NGCN.

When the wireless device 120 detects such information, if the wireless device 120 also supports to connect to the second type of core network such as NGCN, then the first NAS message transmitted by the wireless device 120 toward core network will be a NAS for the second type of core network such as the NGCN.

Via detect this first NAS message, the network node 111 being an eLTE eNB may then direct the wireless device 120 to the second type of core network such as NGCN so that the wireless device 120 can enjoy a better service from the second type of core network such as NGCN.

In this action, the network node 111 may thus send to the wireless device 120, information that the network node 111, 112 is capable of connect to the second type of core network.

Action 806

In these embodiments, the network node 111 may receive from the wireless device 120, a first NAS message, which NAS message is of the second type based on the sent information.

Action 807

Based on that the NAS message is of the second type, the network node 111 may then in these embodiments forwarding the NAS message of the second type to the second type of core network 102.

Action 808

In some embodiments the network node 111, 112 sends a command from a network node 111, 112 in the communications network 100, commanding the wireless device to perform the configuration performed according to the above.

As mentioned above, the actions above may be performed in any suitable order. E.g. regarding a user plane handling of PDCP, the wireless device 120 may perform NAS signalling to the right CN before even PDCP user plane is setup. In fact PDCP configuration of user plane comes after the RAN knows which CN the wireless device 120 is attached to, e.g. according to the steps in the following example (not shown):
1. The network nodes 111, 112 in the network broadcast support for NGCN and EPC.
2. The wireless device 120 selects to connect to NGCN meaning it generate a NAS message which is using NGCN NAS. The wireless device 120 sends this message and an indication to the RAN such as the RAN 116, 117 that I wants to connect to NGCN.
3. Then there is some Signalling to complete the attach to NGCN.
4. The RAN gets an indication from the CN that the wireless device 120 is now connected to NGCN.
5. The RAN configures the PDCP protocol to be used for Data Transmissions based on this information.
6. The RAN sends this configuration to the wireless device 120.
7. The wireless device 120 applies this configuration locally.
8. Then, data can be sent.

Additionally to this above showing the configuration of PDCP for user plane, there may also a configuration of PDCP for control plane. This means that the wireless device 120 may need to locally configure PDCP when sending the initial message to the network e.g. step 2. This is since PDCP is also used to carry RRC and NAS messages. Then there may be some other messages from RAN to further configure PDCP used for control plane message in between step 2 and 3, e.g. RRC connection setup or re-configuration. For PDCP for a control plane message it may be unlikely that QoS flow ID will be used so in this way it may not be different depending on which type of core network the wireless device 120 is connecting to. However there may be some other parameters that differ such as e.g. any one or more out of: Encryption related parameters such as PDCP sequence number used as input to encryption algorithm, Integrity protection of user data related parameters, or parameters related to in-sequence delivery, and the size of a PDCP sequence number.

Additionally there may be some configuration of PDCP for the wireless device 120 performed for Signaling Radio Bearers (SRBs) which is used at initial communication with the network, even prior to for the wireless device 120 being attached to the core network. Also this PDCP configuration may be type of core network specific. This is also advantageous since potentially this configuration is done for the wireless device 120 just based on the knowledge which type of core network the wireless device connects to. No additional instructions may be sent from the RAN.

Figure 9:
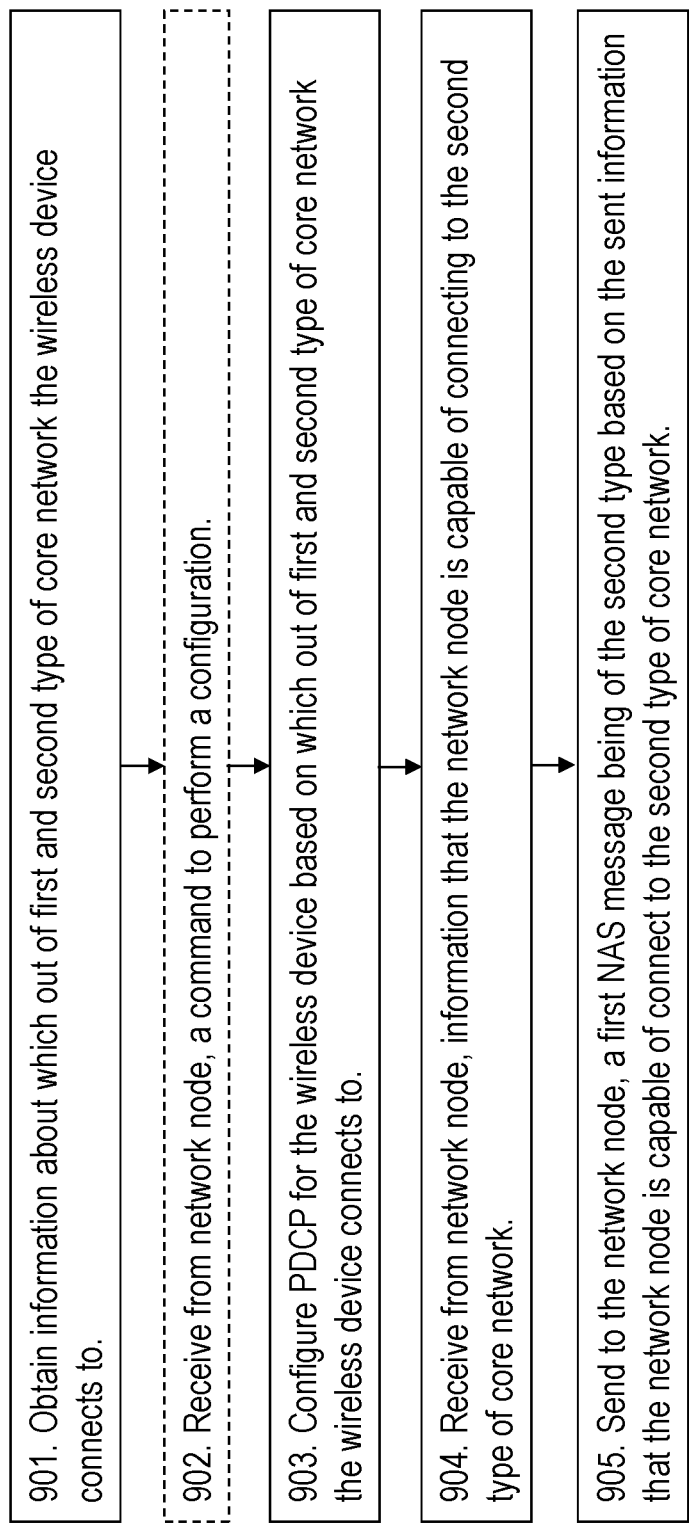
FIG. 9 is a flowchart depicting embodiments of a method in a wireless device.

Example embodiments of a method performed by the wireless device 120 for configuring a PDCP for the wireless device 120 in the communications network 100 will be described with reference to a flowchart depicted in FIG. 9. As mentioned above the first type and the second type relate different generations of telecommunication networks. The first type of telecommunication network may relate to 4G, and the second type of telecommunication network may relate to 5G.

The communications network 100 comprises the first type of core network 101 and the second type of core network 102.

The method comprises the following actions, which actions may be taken in any suitable order. Actions that are optional are presented in dashed boxes in FIG. 9.

The wireless device 120 may configure its PDCP layer used for transmission of data or signalling to the network based on the knowledge of which type of core network the wireless device 120 connects. The configuration may comprise different security configuration incl. encryption and integrity protection algorithms, or parameter setting. It may also include different PDCP sequence number length or other PDCP header fields. The wireless device 120 may also select to use a specific NAS protocol depending on which CN the wireless device 120 is connecting to.

Action 901

The wireless device 120 obtains information about which type of core network the wireless device connects to out of the first type and the second type, which first type and the second type relate to different generations of telecommunication networks. This may be obtained by the wireless device 120 getting an acknowledgement from the core network the wireless device 120 has attempted to connect to or register with. The acknowledgment could imply that the wireless device 120 should be considered connected to that core network.

Action 902

There may be some initial configuration of PDCP that the wireless device 120 performs just based on the knowledge of which type of core network the wireless device 120 is connecting to or is connected to. This may be a typical example for PDCP used for signalling.

Once the wireless device 120 is connected and getting active in the network to send and/or receive user plane data, the PDCP layer for user data will be configured by the network. An RRC configuration command may be sent to the wireless device 120 comprising instructions on how to configure the PDCP layer in the wireless device 120. These instructions may however most likely be combined with the wireless device's 120 own knowledge about which type of core network it is connected to. For example, the wireless device 120 may only accept PDCP parameter configurations that are compatible with the type of core network to which it is connected. As another example, the wireless device 120 may fill in incomplete PDCP configuration information received from the network, based on the type of core network involved. Here, because the RAN knows that the wireless device 120 sets one or more PDCP parameters in dependence on the type of core network it connects to, configuration information sent to the device from the network need not include values for those parameters.

Thus, according to some embodiments herein, the wireless device 120 receives a command from a network node 111, 112 in the communications network 100, commanding the wireless device to perform the configuration.

The command may specify which one of the options in Action 903 below.

Action 903

According to embodiments herein, the wireless device 120 configures the PDCP for the wireless device 120 based on which type of core network the wireless device 120 connects to, out of a core network 101 of a first type, and a core network 102 of a second type. An advantage by basing the configuration of the PDCP on which type of core network the wireless device 120 connects to is that not all parameters of the PDCP configuration needs to be signaled from the network to the wireless device 120 since the wireless device 120 may use the knowledge of which core network it is connected to in order to configure some parameters in a suitable way for that core network. Additionally the wireless device 120 may detect and report erroneous configurations which are not consistent with the core network the wireless device 120 is connected to, avoiding possible error cases from going undetected. Additionally the wireless device 120 may configure the initial PDCP configuration for example used for initial signaling prior to receiving any detailed instructions from the network based on a PDCP configuration suitable for the core network the wireless device 120 wants to connect to or is connected to.

The configuring of the PDCP for the wireless device 120 may comprise configuring PDCP parameters comprising any one or more out of: QoS flow ID, Header Compression related parameters, Encryption related parameters, Integrity protection of user data related parameters, and parameters related to in-sequence delivery, or the size of a PDCP sequence number.

Which configuration to perform, may in some embodiments be specified in the command.

In some embodiments, when the network node 111, 112 is a master node, the wireless device 120 configures the PDCP for the wireless device 120 based on which type of core network the wireless device 120 connects to, out of the core network 101 of a first type, and the core network 102 of a second type.

In the embodiments, wherein the network node 111, 112 is a master node, the configuring of the PDCP for the wireless device 120 based on which type of core network the wireless device 120 connects to comprises:

When the network node 111, 112, connects to the first type of core network, the wireless device 120 configures the PDCP without QoS flow ID, for the wireless device 120, and—when the network node 111, 112, connects to the second type of core network the wireless device 120 configures the PDCP with QoS flow ID for the wireless device 120.

In some embodiments, when the network node 111, 112 is a secondary node, the wireless device 120 configures the PDCP for the wireless device 120 based on any one or more out of:

(1) Which type of master node the network node 111, 112 connects to, out of a master node of a first type, and a master node of a second type, and
(2) which type of core network the wireless device 120 connects to, out of a core network 101 of a first type, and a core network 102 of a second type.

In the embodiments, wherein the network node 111, 112 is a secondary node, the configuring of the PDCP for the wireless device 120 based on (1) which type of master node the network node 111, 112 connects may comprise: When the network node 111, 112, connects to the first type of master node, configuring the PDCP without QoS flow ID for the wireless device 120, and when the network node 111, 112, connects to the second type of master node, configuring the PDCP with QoS flow ID for the wireless device 120. The first type of master node may relate to an LTE network node, and the second type of master node may relate to a 5G core network.

In the embodiments, wherein the network node 111, 112 is a secondary node, and the configuring of the PDCP for the wireless device 120 based on (2) which type of core network the wireless device 120 connects to may comprise: When the wireless device 120 connects to the first type of core network, configuring the PDCP without QoS flow ID for the wireless device 120, and when the network node 111, 112, connects to the second type of core network, configuring the PDCP with QoS flow ID for the wireless device 120.

The first type of telecommunication network may relate to 4G and the second type of telecommunication network may relate 5G. Further, the first type of core network may relate to an EPC core network, and the second type of core network may relate a 5G core network.

Action 904

In the embodiments, wherein the network node 111, 112 is a first type of network node and is capable of connect to the second type of core network 102, and wherein the wireless device 120 is capable to connect to the second type of core network 102, the Action 904-905 may be performed.

The wireless device 120 receives from the network node 111, 112 information that the network node 111, 112 is capable of connect to the second type of core network.

Action 905

In the embodiments, the wireless device 120 may send to the network node 111, 112, a first NAS message. The NAS message is of the second type based on the sent information that the network node 111, 112 is capable of connect to the second type of core network. This enables the network node 111, 112 to forward the NAS message is of the second type to the second type of core network 102.

Figure 10:
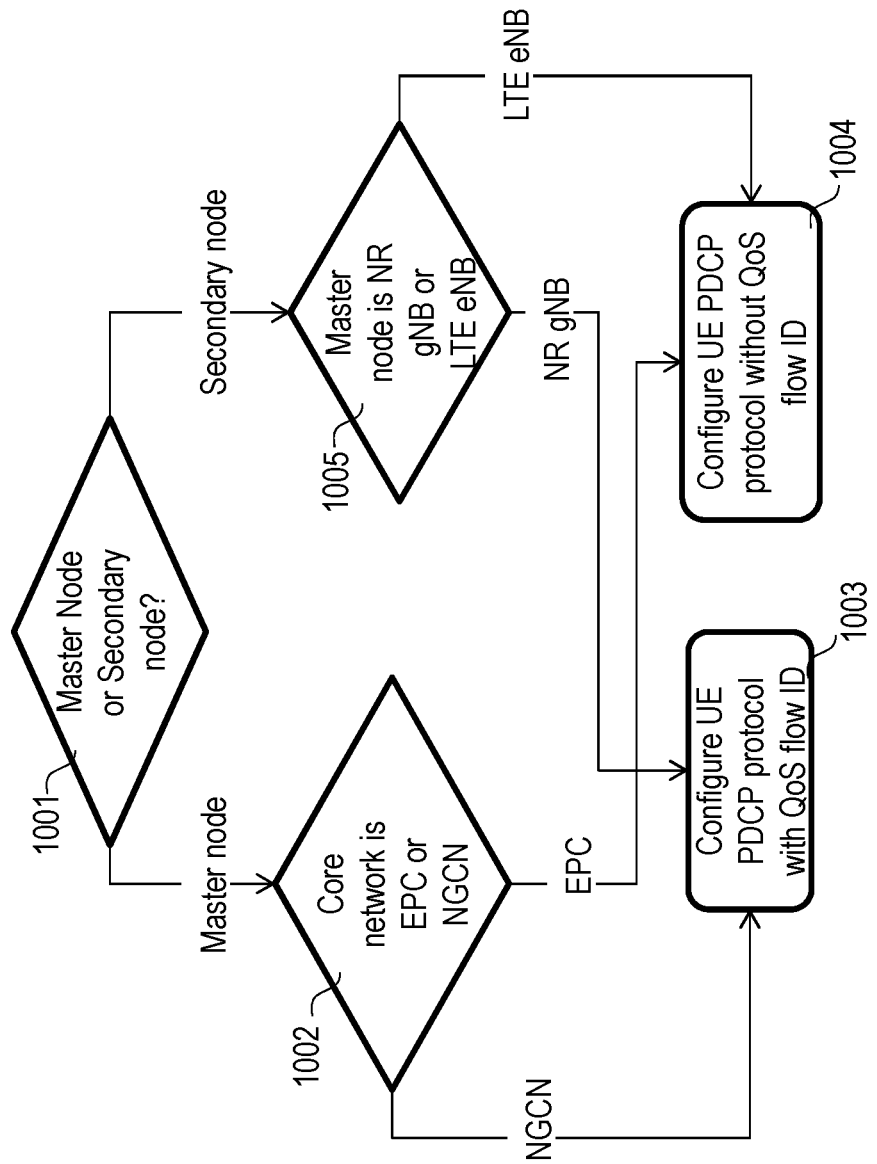
FIG. 10 is a flowchart depicting embodiments of a method in a network node.

Embodiment's herein will now be further exemplified referring to a flowchart of FIG. 10. The flowchart illustrates an example of how the network node 111, 112 configures the PDCP for the wireless device according to embodiments herein.

The text below is applicable to and may be combined with any suitable embodiment described above.

The network node 111, 112 decides 1001 whether it is a master node or a secondary node for the wireless device.

The Network Node 111, 112 is a Master Node

When the network node 111, 112 is a master node, the network node 111, 112 decides 1002 which out of first and second type of core network 101, 102 the wireless device 120 connects to. In this example which one out of EPC and NGCN.

NGCN: When the wireless device 120 connects to the second type of core network 102 in this example NGCN, the network node 111, 112 configures 1003 the PDCP for the wireless device 120, referred to as UE PDCP protocol in FIG. 10, with QoS flow ID.

EPC: When the wireless device 120 connects to the first type of core network 101 in this example EPC, the network node 111, 112 configures 1004 the PDCP for the wireless device 120 without QoS flow ID.

The Network Node 111, 112 is a Secondary Node

When the network node 111, 112 is a secondary node, the network node 111, 112 decides 1005 which out of first and second type of master node the network node 111, 112 connects to. In this example which one out of LTE eNB and NR gNB.

NR gNB: When the network node 111, 112 connects to the second type of master node, in this example an NR gNB, the network node 111, 112 configures 1003 the PDCP for the wireless device 120 with QoS flow ID.

LTE eNB: When the network node 111, 112 connects to the first type of master node, in this example an LTE eNB, the network node 111, 112 configures 1004 the PDCP for the wireless device 120 without QoS flow ID.

Figure 11:
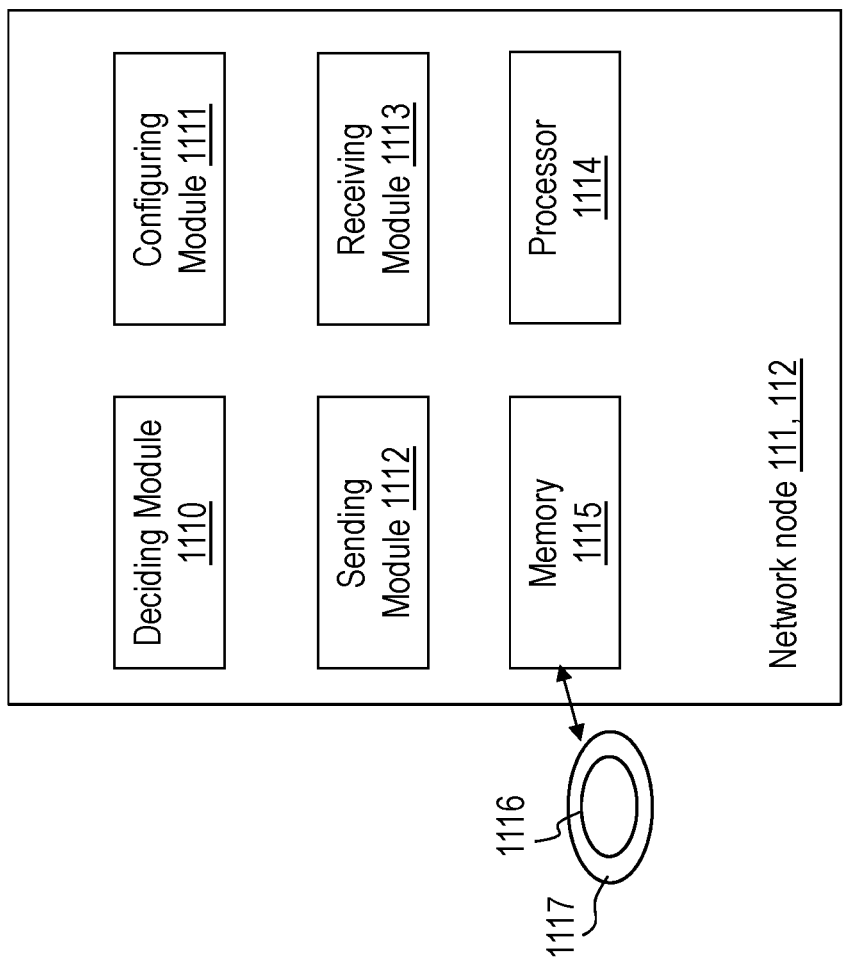
FIG. 11 is a schematic block diagram illustrating embodiments of a network node.

To perform the method actions for configuring the PDCP for the wireless device 120 in the communications network 100, the network node 111, 112 may comprise the following arrangement depicted in FIG. 11. As mentioned above, the communications network 100 is adapted to comprise a first type of core network 101 and a second type of core network 102.

The network node 111, 112 is adapted to, e.g. by means of a deciding module 1110 adapted to, decide whether the network node 111, 112 is a master node or a secondary node for the wireless device 120.

The network node 111, 112 may further being adapted to e.g. by means of the deciding module 1110 adapted to, decide which type of core network the wireless device 120 connects to, out of the first type of core network 101, and the second type of core network 102.

In some embodiments wherein the network node 111, 112 is a secondary node, the network node 111, 112 may further be adapted to, e.g. by means of the deciding module 1110 adapted to, decide which type of master node the network node 111, 112 connects to, out of the first type of master node, and the second type of master node.

The network node 111, 112 is adapted to, e.g. by means of a configuring module 1111 adapted to:

When the network node 111, 112 is a master node, configure the PDCP for the wireless device 120 based on which type of core network the wireless device 120 connects to, out of a core network 101 of a first type, and a core network 102 of a second type, and when the network node 111, 112 is a secondary node, configure the PDCP for the wireless device 120 based on any one or more out of:
  which type of master node the network node 111, 112 connects to, out of a master node of a first type, and a master node of a second type,
  which type of core network the wireless device 120 connects to, out of a core network 101 of a first type, and a core network 102 of a second type.

The first type and the second type are adapted to relate to different generations of telecommunication networks.

The first type of telecommunication network may be adapted to relate to fourth Generation, 4G, and the second type of telecommunication network may be adapted to relate to a fifth Generation, 5G.

In some embodiments, wherein the network node 111, 112 is a master node, the network node 111, 112 may further be adapted to e.g. by means of the configuring module 1111 adapted to, configure the PDCP for the wireless device 120 based on which type of core network the wireless device 120 connects to by, when the network node 111, 112, connects to the first type of core network, configure the PDCP without Quality of Service, QoS, flow Identity, ID, for the wireless device 120, and when the network node 111, 112, connects to the second type of core network configure the PDCP with QoS flow ID for the wireless device 120.

The first type of core network may be adapted to relate to an EPC core network, and the second type of core network may be adapted to relate to a 5G core network such as NGCN.

In some embodiments, wherein the network node 111, 112 is a secondary node, the network node 111, 112 may further be adapted to e.g. by means of the configuring module 1111 adapted to, configure the PDCP for the wireless device 120 based on which type of master node the network node 111, 112 connects to by: When the network node 111, 112, connects to the first type of master node, configure the PDCP without Quality of Service flow Identity, ID, for the wireless device 120, and when the network node 111, 112, connects to the second type of master node, configure the PDCP with QoS flow ID for the wireless device 120.

The first type of master node may be adapted to relate to an LTE network node such as an eNB, and the second type of master node is adapted to relate to a 5G network node such as a 5G gNB.

In some embodiments, wherein the network node 111, 112 is a secondary node, the network node 111, 112 may further be adapted to e.g. by means of the configuring module 1111 adapted to, configure the PDCP for the wireless device 120 based on which type of core network the wireless device 120 connects to by: When the wireless device 120 connects to the first type of core network, configure the PDCP without flow ID for the wireless device 120, and when the network node 111, 112, connects to the second type of core network, configure the PDCP with QoS flow ID for the wireless device 120.

In some embodiments, wherein the network node 111, 112 is a first type of network node and is capable of connect to the second type of core network 102, and wherein the wireless device 120 is capable to connect to the second type of core network 102, the network node 111, 112 may further be adapted to, e.g. by means of a sending module 1112 adapted to, send to the wireless device 120 information that the network node 111, 112 is capable of connect to the second type of core network.

In these embodiments, the network node 111, 112 may further be adapted to, e.g. by means of a receiving module 1113 adapted to, receive from the wireless device 120, a first NAS message. The NAS message is of the second type based on the sent information.

In these embodiments, the network node 111, 112 may further be adapted to, e.g. by means of the sending module 1112 adapted to, based on that the NAS message is of the second type, forward the NAS message of the second type to the second type of core network 102.

In some embodiments, the network node 111, 112 may further be adapted to e.g. by means of the configuring module 1111 adapted to perform any configuring of the PDCP for the wireless device 120 by any one or more out of:

configuring for Signaling Radio Bearers, SRBs, and configure the PDCP for the wireless device 120 by configuring PDCP parameters comprising any one or more out of: QoS flow ID, Header Compression related parameters, Encryption related parameters, Integrity protection of user data related parameters, and parameters related to in-sequence delivery, or the size of a PDCP sequence number.

The embodiments herein for configuring a PDCP for the wireless device 120 in the communications network 100, may be implemented through one or more processors, such as the processor 1114 of a processing circuitry in the the network node 111, 112 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the network node 111, 112. One such carrier may be in the form of a CD ROM disc. It is however feasible with other data carriers such as a memory stick. The computer program code may furthermore be provided as pure program code on a server and downloaded to the the network node 111, 112.

The network node 111, 112 may further comprise a memory 1115 comprising one or more memory units. The memory 1115 comprises instructions executable by the processor 1114.

The memory 1115 is arranged to be used to store e.g. information about assigned resources, data, configurations, and applications to perform the methods herein when being executed in the network node 111, 112.

In some embodiments, a computer program 1116 comprises instructions, which when executed by the at least one processor 1114, cause the at least one processor 1114 to perform actions according to any of the Actions 801-808.

In some embodiments, a carrier 1117 comprises the computer program 1116, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the network node 111, 112, described above may refer to a combination of analog and digital circuits, and/or one or more processors configured with software and/or firmware, e.g. stored in the memory 1115, that when executed by the one or more processors such as the processor 1114 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 12:
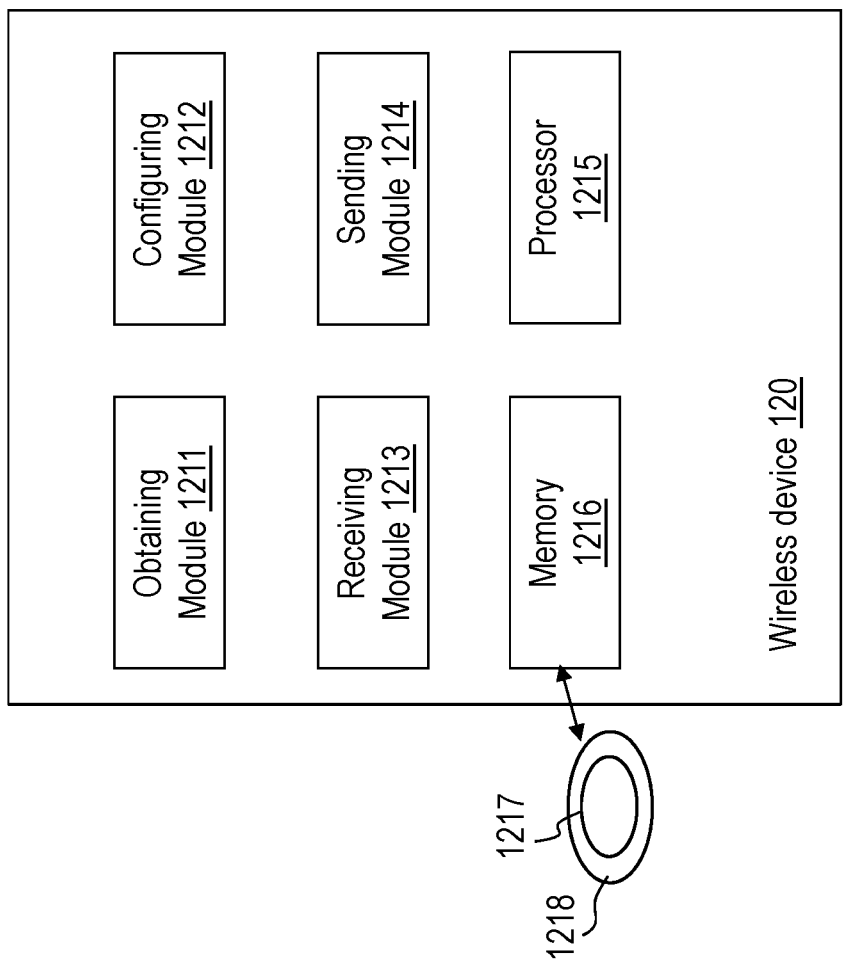
FIG. 12 is a schematic block diagram illustrating embodiments of a wireless device.

To perform the method actions for configuring the PDCP for the wireless device 120 in the communications network 100, the wireless device 120 may comprise the following arrangement depicted in FIG. 12. As mentioned above, the communications network 100 is adapted to comprise a first type of core network 101 and a second type of core network 102.

The wireless device 120 is adapted to, e.g. by means of an obtaining module 1211 adapted to obtain information about which type of core network the wireless device connects to out of a first type and a second type adapted to relate to different generations of telecommunication networks.

The wireless device 120 is further adapted to, e.g. by means of a configuring module 1212 adapted to configure the PDCP for the wireless device 120 based on which type of core network the wireless device 120 connects to, out of a core network 101 of a first type, and a core network 102 of a second type.

The wireless device 120 is further adapted to, e.g. by means of a receiving module 1213 adapted to receive a command from a network node 111, 112 in the communications network 100, commanding the wireless device to perform the configuration.

The wireless device 120 may further be adapted to, e.g. by means of the configuring module 1212 adapted to, perform the configuration by:

When the network node 111, 112 is a master node, configure the PDCP for the wireless device 120 based on which type of core network the wireless device 120 connects to, out of a core network 101 of a first type, and a core network 102 of a second type, and when the network node 111, 112 is a secondary node, configure the PDCP for the wireless device 120 based on any one or more out of:

which type of master node the network node 111, 112 connects to, out of a master node of a first type, and a master node of a second type, which type of core network the wireless device 120 connects to, out of a core network 101 of a first type, and a core network 102 of a second type.

The first type and the second type are adapted to relate to different generations of telecommunication networks.

The first type of telecommunication network may be adapted to relate to 4G, and the second type of telecommunication network may be adapted to relate to 5G.

In some embodiments, wherein the network node 111, 112 is a master node, the wireless device 120 may further be adapted to, e.g. by means of the configuring module 1212 adapted to, configure the PDCP for the wireless device 120 based on which type of core network the wireless device 120 connects to by: When the network node 111, 112 connects to the first type of core network, configure the PDCP without Quality of Service, QoS, flow Identity, ID, for the wireless device 120, and when the network node 111, 112, connects to the second type of core network configure the PDCP with QoS flow ID for the wireless device 120.

The first type of core network may be adapted to relate to an EPC core network, and the second type of core network may be adapted to relate to a 5G core network such as NGCN.

In some embodiments, wherein the network node 111, 112 is a secondary node the wireless device 120 may further be adapted to, e.g. by means of the configuring module 1212 adapted to, configure the PDCP for the wireless device 120 based on which type of master node the network node 111, 112 connects to by: When the network node 111, 112, connects to the first type of master node, configure the PDCP without Quality of Service flow Identity, ID, for the wireless device 120, and when the network node 111, 112, connects to the second type of master node, configure the PDCP with QoS flow ID for the wireless device 120.

The first type of master node may be adapted to relate to an LTE network node such as an eNB, and the second type of master node may be adapted to relate to a, 5G network node such as a gNB.

In some embodiments, wherein the network node 111, 112 is a secondary node the wireless device 120 may further be adapted to, e.g. by means of the configuring module 1212 adapted to, configure the PDCP for the wireless device 120 based on which type of core network the wireless device 120 connects to by: When the wireless device 120 connects to the first type of core network, configure the PDCP without Quality of Service flow Identity, ID, for the wireless device 120, and when the network node 111, 112, connects to the second type of core network, configure the PDCP with QoS flow ID for the wireless device 120.

In some embodiments, wherein the network node 111, 112 is a first type of network node and is capable of connect to the second type of core network 102, and wherein the wireless device 120 is capable to connect to the second type of core network 102, the wireless device 120 may further be adapted to, e.g. by means of the receiving module 1213 adapted to, receive from the network node 111, 112 information that the network node 111, 112 is capable of connect to the second type of core network.

In these embodiments, the wireless device 120 may further be adapted to, e.g. by means of the sending module 1214 adapted to, send to the network node 111, 112, a first NAS message. The first NAS message is of the second type based on the sent information. This enables the network node 111, 112 to forward the first NAS message is of the second type to the second type of core network 102.

In some embodiments, the wireless device 120 may further be adapted to e.g. by means of the configuring module 1212 adapted to perform the configuring of the PDCP for the wireless device 120 by any one or more out of:

configuring for Signaling Radio Bearers, SRBs, and configuring PDCP parameters comprising any one or more out of: QoS flow ID, Header Compression related parameters, Encryption related parameters, Integrity protection of user data related parameters, and parameters related to in-sequence delivery, or the size of a PDCP sequence number.

The embodiments herein for configuring a PDCP for the wireless device 120 in the communications network 100, may be implemented through one or more processors, such as the processor 1215 of a processing circuitry in the the wireless device 120 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the wireless device 120. One such carrier may be in the form of a CD ROM disc. It is however feasible with other data carriers such as a memory stick. The computer program code may furthermore be provided as pure program code on a server and downloaded to the the wireless device 120.

The wireless device 120 may further comprise a memory 1216 comprising one or more memory units. The memory 1216 comprises instructions executable by the processor 1215.

The memory 1216 is arranged to be used to store e.g. information about assigned resources, data, configurations, and applications to perform the methods herein when being executed in the wireless device 120.

In some embodiments, a computer program 1217 comprises instructions, which when executed by the at least one processor 1215, cause the at least one processor 1215 to perform actions according to any of the Actions 901-905.

In some embodiments, a carrier 1218 comprises the computer program 1217, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the wireless device 120, described above may refer to a combination of analog and digital circuits, and/or one or more processors configured with software and/or firmware, e.g. stored in the memory 1216, that when executed by the one or more processors such as the processor 1215 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method of operation by a wireless device, the method comprising:
   determining that a Radio Access Network (RAN) node of a first generational type provides connectivity to a Core Network (CN) of a second generational type, the first and second generational types corresponding to different generations of wireless communication networks;
   in conjunction with connecting to the RAN node for connectivity to the CN of the second generational type, configuring a Packet Data Convergence Protocol (PDCP) of the wireless device such that the PDCP has certain parameters set in dependence on the RAN node being of the first generational type and certain other parameters set in dependence on the CN being of the second generational type;
   wherein the first generational type is a Fourth Generation (4G) of wireless communication networks, as defined by the Third Generation Partnership Project (3GPP), and the second generational type is a Fifth Generation (5G) of wireless communication networks, as defined by the 3GPP; and
   wherein the certain other parameters comprise a size of PDCP sequence number that is set according to sizing associated with CNs of the second generational type.

2. The method of claim 1, wherein determining that the RAN node provides connectivity to the CN of the second generational type comprises receiving signaling from the RAN node indicating the option of connecting to the CN of the second generational type.

3. The method of claim 1, wherein the certain other parameters further comprise a Quality-of-Service (QoS) flow Identifier (ID) for the wireless device, for flow-based QoS control in the CN of user data going between the wireless device and the CN via the RAN node.

4. The method of claim 1, further comprising configuring Non-Access Stratum (NAS) signaling of the wireless device, in dependence on the CN being of the second generational type.

5. The method of claim 1, wherein the RAN node provides connectivity to another CN, the other CN being of the first generational type, and wherein the method includes, when connecting to the RAN node, targeting for connectivity either the CN of the first generational type or the CN of the second generational type, and wherein configuring the PDCP of the wireless device comprises configuring the certain parameters according to the generational type of the RAN node and configuring the certain other parameters according to the generational type of the targeted CN.

6. The method of claim 5, further comprising configuring Non-Access Stratum (NAS) signaling at the wireless device according to the generational type of the targeted CN.

7. The method of claim 5, further comprising selecting, as the targeted CN, either the CN of the first generational type or the CN of the second generational type, in dependence on a type of communication service to be supported by the connectivity.

8. A wireless device comprising:
   communication circuitry configured for wirelessly connecting to a Radio Access Network (RAN) node of a first generational type; and
   processing circuitry operatively associated with the communication circuitry and configured to:
      determine that the RAN node provides connectivity to a Core Network (CN) of a second generational type, the first and second generational types corresponding to different generations of wireless communication networks; and
      in conjunction with the wireless device connecting to the RAN node for connectivity to the CN of the second generational type, configure a Packet Data Convergence Protocol (PDCP) of the wireless device such that the PDCP has certain parameters set in dependence on the RAN node being of the first generational type and certain other parameters set in dependence on the CN being of the second generational type;
   wherein the first generational type is a Fourth Generation (4G) of wireless communication networks, as defined by the Third Generation Partnership Project (3GPP), and the second generational type is a Fifth Generation (5G) of wireless communication networks, as defined by the 3GPP; and
   wherein the certain other parameters comprise a size of PDCP sequence number that is set according to sizing associated with CNs of the second generational type.

9. The wireless device of claim 8, wherein the processing circuitry is configured to determine that the RAN node provides connectivity to the CN of the second generational type based on the wireless device receiving signaling from the RAN node indicating the option of connecting to the CN of the second generational type.

10. The wireless device of claim 8, wherein the certain other parameters further comprise a Quality-of-Service (QoS) flow Identifier (ID) for the wireless device, for flow-based QoS control in the CN of user data going between the wireless device and the CN via the RAN node.

11. The wireless device of claim 8, wherein the processing circuitry is further configured to configure Non-Access Stratum (NAS) signaling of the wireless device, in dependence on the CN being of the second generational type.

12. The wireless device of claim 8, wherein the RAN node provides connectivity to another CN, the other CN being of the first generational type, and, when connecting to the RAN node, the processing circuitry is configured to target for connectivity either the CN of the first generational type or the CN of the second generational type and configure the certain parameters of the PDCP according to the generational type of the RAN node and configure the certain other parameters of the PDCP according to the generational type of the targeted CN.

13. The wireless device of claim 12, wherein the processing circuitry is configured to configure Non-Access Stratum (NAS) signaling at the wireless device according to the generational type of the targeted CN.

14. The wireless device of claim 12, wherein the processing circuitry is configured to select, as the targeted CN, either the CN of the first generational type or the CN of the second generational type, in dependence on a type of communication service to be supported by the connectivity.

* * * * *

UNITED STATES PATENT AND TRADEMARK OFFICE
CERTIFICATE OF CORRECTION

PATENT NO. : 10,609,749 B2
APPLICATION NO. : 15/521068
DATED : March 31, 2020
INVENTOR(S) : Fan et al.

Page 1 of 1

It is certified that error appears in the above-identified patent and that said Letters Patent is hereby corrected as shown below:

In the Specification

Column 1, Line 35, delete "( 5G)" and insert -- (5G) --, therefor.

Column 2, Line 50, delete "use plane traffic" and insert -- user plane traffic --, therefor.

Column 7, Line 17, delete "such a" and insert -- such as --, therefor.

Column 8, Line 2, delete "such a" and insert -- such as a --, therefor.

Column 10, Lines 9-11, delete "embodiments where in embodiments where the network node 111, 112 is a master node." and insert -- embodiments, wherein the network node 111, 112 is a master node --, therefor.

Column 10, Line 27, delete "the configuring the" and insert -- configuring the --, therefor.

Column 10, Lines 40-42, delete "embodiments where in embodiments where the network node 111, 112 is a secondary node." and insert -- embodiments, wherein the network node 111, 112 is a secondary node --, therefor.

Column 15, Line 32, delete "relate a" and insert -- relate to a --, therefor.

Column 21, Line 18, delete "Circuitry" and insert -- Circuit --, therefor.

Signed and Sealed this
Ninth Day of June, 2020

Andrei Iancu
*Director of the United States Patent and Trademark Office*